US012643578B2

(12) United States Patent
VanderLinden et al.

(10) Patent No.: US 12,643,578 B2
(45) Date of Patent: Jun. 2, 2026

(54) PLATFORM TRAVERSAL SYSTEM AND METHOD

(71) Applicant: Transportation IP Holdings, LLC, Norwalk, CT (US)

(72) Inventors: Michael VanderLinden, Knoxville, IA (US); Mark Bachman, Albia, IA (US); Norman Wellings, Agency, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 796 days.

(21) Appl. No.: 18/049,259

(22) Filed: Oct. 24, 2022

(65) Prior Publication Data

US 2023/0174121 A1 Jun. 8, 2023

Related U.S. Application Data

(60) Provisional application No. 63/272,527, filed on Oct. 27, 2021.

(51) Int. Cl.

| | |
|---|---|
| ***B61B 13/00*** | (2006.01) |
| ***B61D 3/18*** | (2006.01) |
| ***B61D 15/00*** | (2006.01) |
| ***B61D 47/00*** | (2006.01) |
| ***B61F 1/08*** | (2006.01) |
| ***B66C 23/50*** | (2006.01) |
| ***E01B 29/06*** | (2006.01) |

(52) U.S. Cl.

CPC ................ *B61B 13/00* (2013.01); *B61D 3/18* (2013.01); *B61D 15/00* (2013.01); *B61D 47/00* (2013.01); *B61F 1/08* (2013.01); *B66C 23/50* (2013.01); *E01B 29/06* (2013.01)

(58) Field of Classification Search

CPC ......... B66C 23/50; E01B 29/10; E01B 29/06; B61D 47/00; B61D 15/00; B61D 47/005; B61D 3/18; B61D 49/00; B61F 1/08; B61B 13/00

See application file for complete search history.

(56) References Cited

U.S. PATENT DOCUMENTS

| | | | | |
|---|---|---|---|---|
| 2,121,181 | A * | 6/1938 | Bayerl | B61D 3/184 105/159 |
| 4,099,635 | A * | 7/1978 | Leonard | B66C 23/50 414/800 |
| 4,809,614 | A * | 3/1989 | Theurer | E01B 29/10 104/9 |

(Continued)

*Primary Examiner* — Cheng Lin
(74) *Attorney, Agent, or Firm* — K&L Gates LLP

(57) ABSTRACT

A system is provided that includes a self-propelled platform that can traverse a first rail of a first vehicle and a first rail of a second vehicle, the first rail of the first vehicle and the first rail of the second vehicle separated in spaced relation. The self-propelled platform has a wheel assembly that can engage the first rail of the first vehicle and the first rail of the second vehicle. The wheel assembly may include at least one guide extending away from the self-propelled platform and having a size and shape to engage a first rail of the first vehicle or the first rail of the second vehicle while a portion of the self-propelled platform remains on the first rail of the first vehicle and the first rail of the second vehicle, to guide the wheel assembly onto the first rail of the first vehicle or the first rail of the second vehicle.

21 Claims, 5 Drawing Sheets

(56) References Cited

U.S. PATENT DOCUMENTS

| | | | | | |
|---|---|---|---|---|---|
| 4,911,599 | A * | 3/1990 | Theurer | E01B 29/10 | 104/5 |
| 5,467,717 | A * | 11/1995 | Theurer | E01B 29/10 | 104/9 |
| 5,904,098 | A * | 5/1999 | Theurer | B66C 23/50 | 414/547 |
| 6,089,162 | A * | 7/2000 | Madison | E01B 29/10 | 104/5 |
| 6,170,401 | B1 * | 1/2001 | Miller | E01B 29/09 | 104/9 |
| 8,393,846 | B1 * | 3/2013 | Coots | B61D 47/00 | 414/339 |
| 9,707,977 | B2 * | 7/2017 | Dehmel | B61D 47/00 | |
| 2003/0205162 | A1 * | 11/2003 | Herzog | E01B 29/00 | 104/2 |

* cited by examiner

PLATFORM TRAVERSAL SYSTEM AND METHOD

CROSS REFERENCE TO RELATED APPLICATION

This application claims priority to U.S. Provisional Application No. 63/272,527 (filed 27 Oct. 2021), The entire disclosure of that application is incorporated herein by reference.

BACKGROUND

Technical Field

The subject matter described herein relates to a system that includes a self-propelled platform capable of traveling over a gap between vehicles of a vehicle system.

Description of the Art

Certain vehicle systems present two or more vehicles that are coupled with one another, are aligned, and may carry cargo, materials, and the like significant distances. In one example, a rail vehicle may include numerous vehicles, with each vehicle including individual vehicles that may be used to haul materials such as coal, grain, dirt, ore, and the like from one location to another. In other examples, mining vehicles, off-road vehicles, agricultural vehicles, and the like may be similarly coupled to one another for transporting materials.

Once a vehicle system is ready for unloading, a self-propelled platform may be used to assist in unloading the materials. The self-propelled platform may travel along the top of rails of a vehicle and include an implement, such as an excavator, for assisting in the removal of the material for each vehicle. For such a self-propelled platform to move from a first vehicle to a second vehicle, bridges must be disposed between a first vehicle and second vehicle over which the self-propelled platform may travel to get from the first vehicle to the second vehicle. Bridges may be elongated pieces of material that can be span between corresponding rails between the two vehicles. Not only are these bridges often awkward, and difficult to handle, but each bridge must be securely fastened to each vehicle. When numerous vehicles, such as dozens, are in a single vehicle system, this process is labor intensive, and requires significant man-hours. In addition, only after all of the bridges are in place and secured, can the self-propelled platform be used for removal of materials. As a result, removal of the materials can result in a time-consuming process. In addition, after use of the self-propelled platform, the bridges must then be removed so that the vehicles can move (if the bridge is not able to handle the changing alignment and spacing that occurs during travel of the vehicles). Again, the process can be time-consuming, labor-intensive, and can cause significant delays. It may be desirable to have a self-propelled platform system that provides an ability to move between vehicles of a vehicle system that differs from those that are currently known.

BRIEF DESCRIPTION

In accordance with one embodiment, a system is provided that may include a self-propelled platform that may traverse a first rail of a first vehicle and a first rail of a second vehicle, the first rail of the first vehicle and the first rail of the second vehicle separated in spaced relation. The self-propelled platform may include a wheel assembly that may engage the first rail of the first vehicle and the first rail of the second vehicle. The wheel assembly may include at least one guide extending away from the self-propelled platform and having a size and shape to engage the first rail of the second vehicle while a portion of the self-propelled platform remains on the first rail of the first vehicle to guide the wheel assembly onto the first rail of the second vehicle.

In accordance with one embodiment, a system is provided that may include a self-propelled platform that may traverse a first rail and a second rail of a first vehicle, the first rail and the second rail separated in spaced relation. The self-propelled platform may include a wheel assembly that may engage the first rail and the second rail. The wheel assembly may include a first wheel assembly that may have first plural wheels and a first guide extending away from the self-propelled platform. The first guide may have a size and shape to engage a first rail of a second vehicle to guide the self-propelled platform onto the first rail of the second vehicle. The system may include a second wheel assembly having second plural wheels and a second guide extending away from the self-propelled platform. The second guide may have a size and shape to engage a second rail of the second vehicle to guide the self-propelled platform onto the second rail of the second vehicle.

In accordance with one embodiment, a system is provided that may include a self-propelled platform that can be coupled to an excavator and that may traverse a first rail and a second rail of a first vehicle. The first rail and the second rail may be separated in spaced relation. The self-propelled platform may include a wheel assembly that may engage the first rail and the second rail. The wheel assembly may include a first wheel assembly having first plural wheels and a first guide extending away from the self-propelled platform. The first guide may have a size and shape to engage a first rail of a second vehicle to guide the self-propelled platform onto the first rail of the second vehicle. The wheel assembly may additionally include a second wheel assembly having second plural wheels and a second guide extending away from the self-propelled platform. The second guide may have a size and shape to engage a second rail of the second vehicle to guide the self-propelled platform onto the second rail of the second vehicle.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the subject matter described herein relates to a system that may include a self-propelled platform that can travel between vehicles of a multi-vehicle vehicle system. The self-propelled platform may include a wheel assembly that has four independent wheel assemblies that each may engage a first rail on a first vehicle and second rail on a second vehicle. Each wheel assembly may include a guide that extends away from its respective wheel assembly. Each wheel assembly may have a size and shape so that when the platform moves from the first vehicle to the second vehicle, the guide engages and catches a corresponding rail of the second vehicle. The guide may align a wheel with the corresponding rail. The guide may extend upwardly to ensure, even if the first vehicle and second vehicle are at different heights, the guide may engage the corresponding rail to place the wheel on the corresponding rail of the second vehicle. The wheel assembly itself keeps one of the plural wheels on the first rail during the platform transition until another wheel of the wheel assembly has engaged the second rail. The wheel assembly supports the platform, during operation, so that initially all the wheels start on the first rail, then at least one wheel is on the first rail and at least one is on the second rail, and finally all the wheels of the wheel assembly are on the second rail. In this manner, a different structure, such as a bridge, does not have to be placed between the first and second vehicle to support the platform and allow movement of the platform from the first vehicle to the second vehicle.

A suitable self-propelled platform can include an implement that is rotatably coupled for movement on the self-propelled platform. Examples of implements may include one or more of an excavator with a bucket or scoop, a picker, a mower, a sprayer, and so on. In one embodiment, the implement may be a robotic arm.

Figure 1:
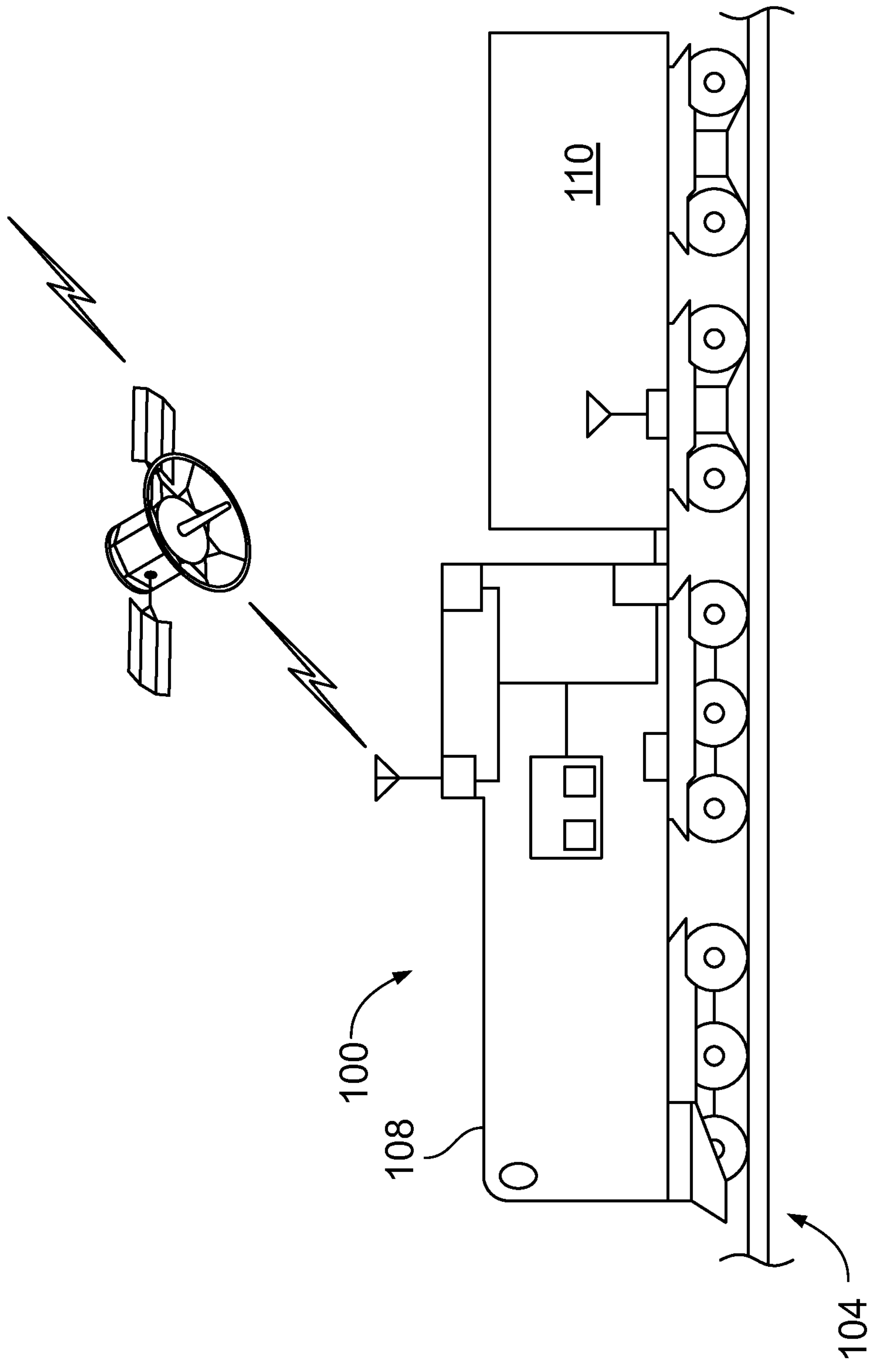
FIG. 1 is a schematic view of a vehicle system.

FIG. 1 illustrates a schematic diagram of one example of a vehicle system 100 in accordance with an embodiment of the invention. FIG. 1 shows a vehicle system that is a rail vehicle. In other embodiments, as suitable vehicle system can be an off-road vehicle, construction vehicle, mining vehicle, marine vessel, and the like. The vehicle system may include two or more vehicles. The vehicle system may travel along a route 104 on a trip from a starting or departure location to a destination or arrival location. In the illustrated example, the vehicle system may include a propulsion-generating vehicle 108 and a non-propulsion-generating vehicle 110. These vehicles may be mechanically interconnected to one another to travel together along the route. In another embodiment, the vehicles in the vehicle system may be logically or virtually coupled together, but not mechanically coupled together. For example, the vehicles may communicate with each other to coordinate their movements so that the vehicles move together as a convoy, platoon, swarm, fleet or consist without the vehicles being mechanically coupled with each other by couplers.

Figure 2:
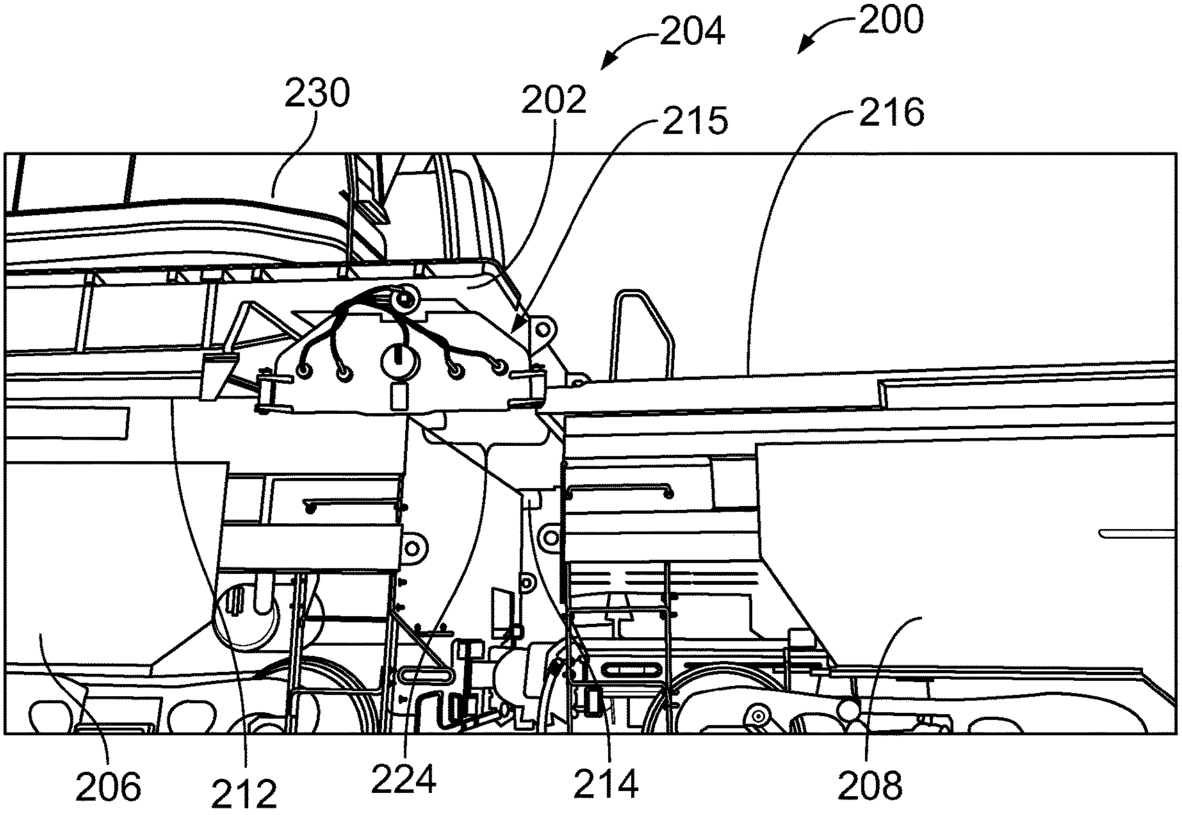
FIG. 2 is a side perspective view of a system including a self-propelled platform for a vehicle system.

FIG. 2 illustrates a system 200 that has a movable implement. In one example, the system is a bogie system. The system may include a self-propelled platform 202 that may move along numerous vehicles of a vehicle system 204. In one example, the self-propelled platform may be self-propelled because the self-propelled platform may move without an external force providing the motive power. Depending on the embodiment and application, the motive power may be mechanical power, hydraulic power, electric power, and the like to move the self-propelled platform along vehicles of a vehicle system. In various embodiments, the self-propelled platform may be controlled by a remote controller, include manual input, operate autonomously, and the like.

During operation, the self-propelled platform may travel from one to another of the vehicles of the vehicle system. This may be from a first vehicle 206 to a second vehicle 208, along with additional vehicles. In this example, the system is on the first vehicle while the second vehicle is to the right of the first vehicle. System, and in particular the self-propelled platform traverses along a first rail 212 and second rail 214 of the first vehicle. The first rail and second rail are spaced apart from one another, and in one example comprise a perimeter of the first vehicle. In an example the first rail and second rail are in parallel spaced relation to one another, and the self-propelled platform extends between the first rail and second rail with components of a wheel assembly 215 contacting the first rail and the second rail. The components contacting the first rail and the second rail of the wheel assembly may include tracks, treads, tires, wheels, bearings, casters, and the like. The components may provide a coupling to the first rail and second rail of the first vehicle that allows movement of the self-propelled platform utilizing the wheel assembly while securing the self-propelled platform to the first rail and second rail to prevent movement of the self-propelled platform perpendicular to the first vehicle.

The second vehicle, similar to the first vehicle may include a first rail 216 and second rail (not shown) where the first rail of the second vehicle aligns with and corresponds with the first rail of the first vehicle, while the second rail of the second vehicle aligns with and corresponds with the second rail of the first vehicle. In this manner, the self-propelled platform may travel from on the first rail and the second rail of the first vehicle, across a gap 224 and onto the first rail and second rail of the second vehicle such that a portion of the self-propelled platform remains on the first rail and second rail of the first vehicle while another portion of the self-propelled platform contacts and may be on the first rail and second rail of the second vehicle. Once the self-propelled platform moves completely across the gap, the wheel assembly components that contacted the first rail of the first vehicle now contact the corresponding first rail of the second vehicle while the wheel assembly components that contacted the second rail of the first vehicle now contact the corresponding second rail of the second vehicle.

The system may include an implement 230 that is coupled to the self-propelled platform. Suitable implements may be, for example, an excavator, scoop, shovel, pick, brush, sprayer, and the like that may assist in the movement, unloading, treatment, handling and the like of materials. In one example, the implement is an excavator, that may include a scoop at the end that picks up material out of a corresponding vehicle and can unload the material. Alternatively, the implement may function to push materials in a vehicle out of an opening, wash the materials, treat the material, break up the materials, and the like. In one example, the implement may be rotatably coupled to the self-propelled platform to provide 360° of movement by the implement. The implement may include a stop element that limits movement of the implement or locks the implement in a fixed position. The implement may include manual inputs, remote inputs, be remote controlled, provide a compartment for an operator to sit, and the like. In one example, the implement may be controlled by the same controller that controls and operates the self-propelled platform. The implement in one example may be a first implement that is detachable from the self-propelled platform and replaced with a second implement. In each instance, the self-propelled platform travels across the numerous vehicles so the implement may be used to provide the function of the implement related to materials, cargo, and the like within the vehicles.

In another example, the wheels include a braking mechanism, and a locking mechanism. The braking mechanism may obtain data or information from sensors associated with the wheels of each wheel assembly, or the system itself. In an example, the sensor may be used to determine whether a gap is too large, misalignment between rails of adjacent vehicles has occurred, or the like. In this manner, if a threshold reading, such as a pressure reading, force reading, etc. is detected or not detected, the braking mechanism may automatically brake and stop the system to prevent the system from falling off the vehicle system, to prevent misalignment, or the like. In one example, a threshold number of wheels that contact a rail must be detected at all times by the sensor, otherwise the braking mechanism automatically stops the system. The locking mechanism may be a pin element, brake, stop element, or the like utilized to prevent movement of the system on the first rail and second rail of a vehicle. Once the system is in a working position to conduct work such as unloading, brushing, treating, etc., the locking mechanism secures the system in place on the first rail and second rail to prevent additional movement to facilitate the working function.

Figure 3:
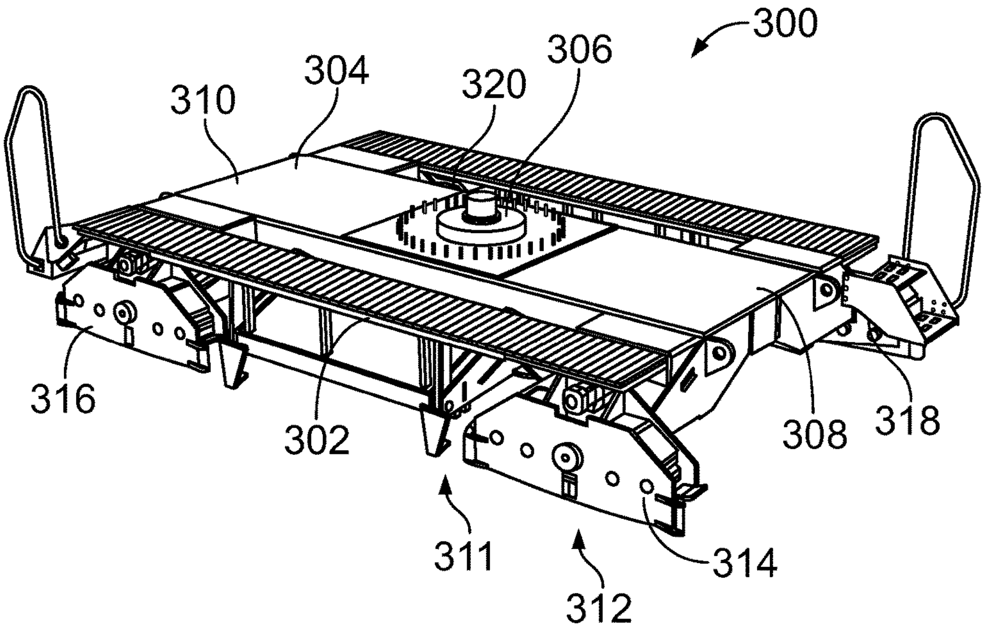
FIG. 3 is a top perspective view of a self-propelled platform for a vehicle system.
Figure 4:
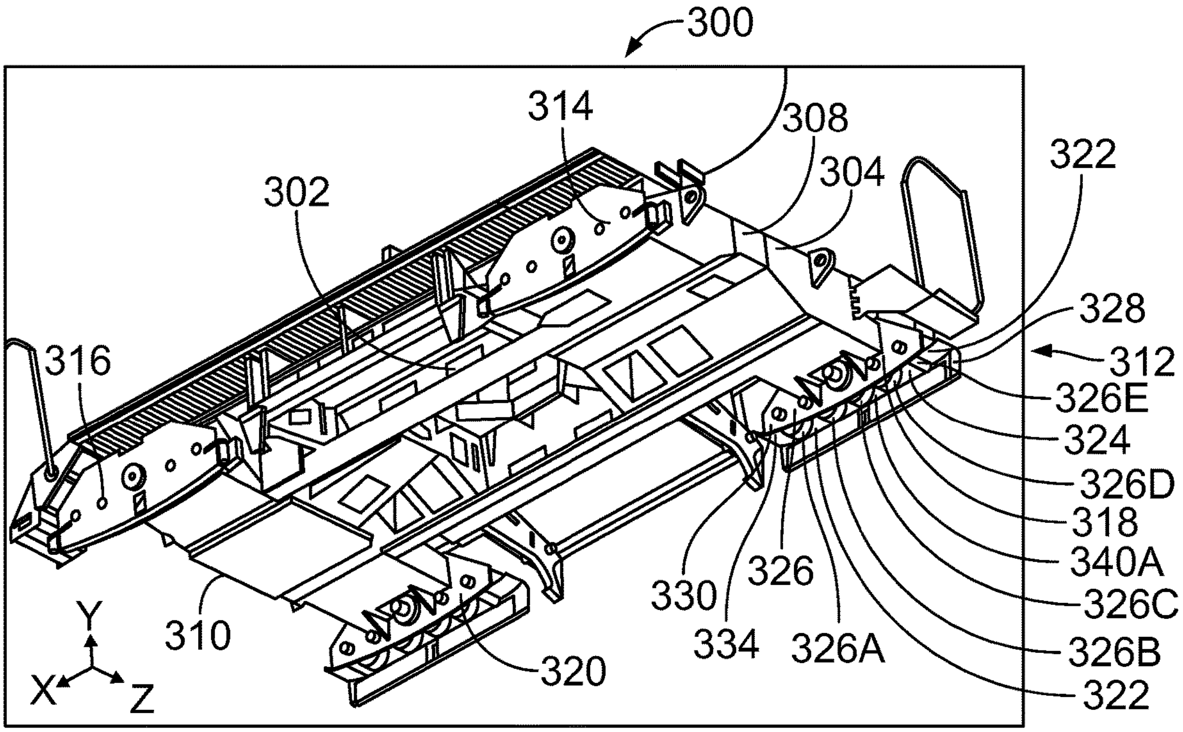
FIG. 4 is a bottom perspective view of a self-propelled platform for a vehicle system.
Figure 5:
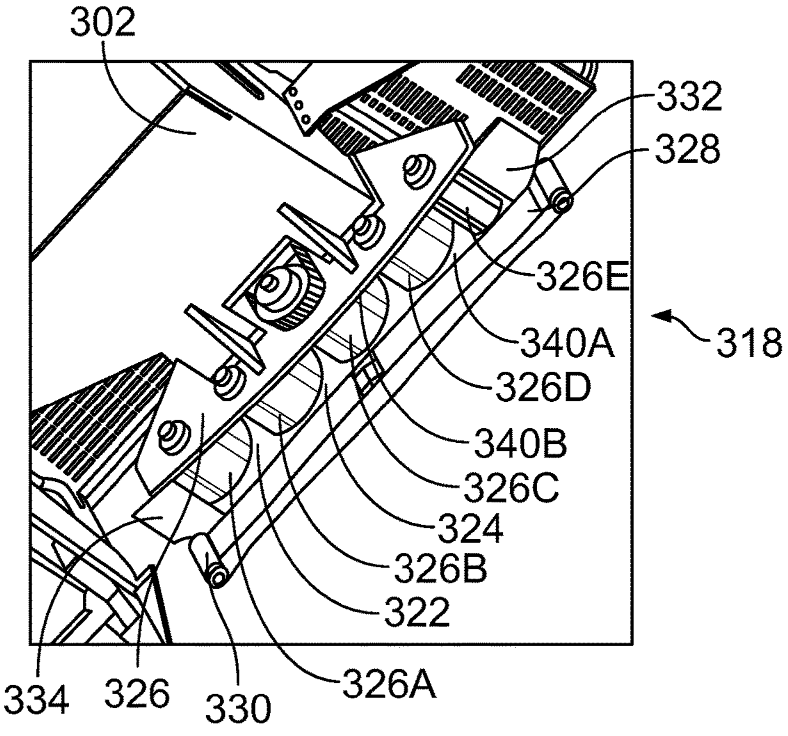
FIG. 5 is a bottom perspective view of a wheel assembly of a system including a self-propelled platform for a vehicle system.

FIGS. 3-5 illustrates differing views of an example self-propelled platform 300. In FIGS. 3-5 the implement is not illustrated to provide better illustration of the example coupling between the self-propelled platform and implement, and to provide better illustration of the other components of the self-propelled platform. In one example, the self-propelled platform of FIGS. 3-5 is the self-propelled platform illustrated in FIG. 2.

The self-propelled platform may include framework 302 that supports a floor 304 that receives a coupling device 306. The floor may extend from a first end 308 to a second end 310. In the example, the coupling device is centrally located on the floor for receiving and coupling an implement to the floor. In one such example, the implement may be an excavator. In the example of FIGS. 3-5 the coupling device is presented to receive an implement that can rotate about the floor. Alternatively, other coupling devices may be provided for other types of implements, movements, and the like.

The system may include a platform mover 311 for actuating a wheel assembly 312 coupled and secured to the framework. Selection of the platform mover may be based at least in part on application specific parameters and requirements. A suitable platform mover may be mechanically based, electrically based, hydraulically based, and the like. The platform mover is responsible for movement of the self-propelled platform. The wheel assembly includes a first wheel assembly 314, a second wheel assembly 316, a third wheel assembly 318, and fourth wheel assembly 320. In the example, the first wheel assembly is at the first end of the floor and aligns with the second wheel assembly at the second end of the floor. Conversely, the third wheel assembly is at the first end of the floor and aligns with the fourth wheel assembly at the second end of the floor. While described and shown with the first wheel assembly and the second wheel assembly aligned with on another on the first rail, the second wheel assembly could be considered a third wheel assembly while the third wheel assembly on the second rail is considered a second wheel assembly.

As illustrated in FIG. 5, each wheel assembly may include a channel 322 that includes a first wall 324 and a second wall of spaced relation. In an example, at least one of the first wall and/or second wall are secured to the framework and/or floor. The channel has a width between the first wall and second wall is greater than the width of at least one rail of a vehicle. In one example, at least one rail may be disposed between the first wall and second wall with the first wall and second wall extending past opposite edges of the rail.

Disposed within the channel between the first wall and second wall are plural wheels 326A, 326B, 326C, 326D, and 326F. In one example, two of the five wheels are drive wheels, while the other three wheels are idling wheels. In other examples, only one, or more than two drive wheels may be used. While five wheels are illustrated, in other examples, more or less wheels may be provided. In other embodiments, not shown, the wheels may be arranged in side-by-side relation, staggered, be spring loaded, and the like. The plural wheels may be sized and shaped to contact and move along the top surface of a rail of a vehicle. Because first wall and second wall extend past either edge of the rail when the plural wheels contact the top surface of the rail, the first wall and second wall prevent lateral, or side-to-side movement of the plural wheels off the top surface the rail. In this manner, the channel secures the self-propelled platform to the rail while allowing the wheel assembly to move along the top surface of the rail.

In one example, the plural wheels are spaced from one another such that when a first wheel contacts a first rail of a first vehicle a final wheel can contact the first rail of a second vehicle. In such an example, wheels between the first wheel and last wheel may not engage either the first rail of the first vehicle or the first rail of the second vehicle, and instead may be over a first gap between the first vehicle and second vehicle. In this manner, the wheel assembly is of size and shape that a portion of the self-propelled platform may be over a first vehicle while another portion of the self-propelled platform is over a second vehicle. The powered wheels may be disposed on opposing ends of the wheel assembly. During transition of the platform, the first powered wheel may leave the first rail so that the second powered wheel, still engaged with the first rail, may provide motive power to the platform. As the first powered wheel engages the second rail, the second powered wheel may leave the first rail so that the platform's motive power is provided by the first wheel, now in contact with the second rail. Similarly, the support and weight distribution of the platform transfers from the first rail to the second rail, and the distribution of the weight through the wheels of the wheel assembly operates in a similar manner to the motive force. That is, while all the wheels are on the first rail, all the wheels bear the load of the platform. During a transition, the first wheel leaves the first rail, and the platform weight is supported by the remaining wheels (powered and unpowered) until the first wheel engages the second rail. Thereafter, the platform weight is supported by various wheels while they are in contact with either rail.

While the transitioning of the wheel assembly from one rail to another is happening on one side of the platform, in one embodiment, another wheel assembly may be transitioning from one to another rail of another rail set on another side of the platform. Additionally, if there is a wheel assembly in each of the four corners of a platform, after the first set of wheel assemblies transition, then a second set of wheel assemblies transition for completion of the traversal of the platform from the first vehicle to the second vehicle. Some embodiments may have additional wheel assembly sets, and so the process would be similar as each set makes the transition across a gap between the vehicles.

In one embodiment, the channel extends from a first side 328 to a second side 330 and has a first guide 332 extending from the first side and a second guide 334 extending from the second side. By having the five wheels along with the first guide and second guide each wheel assembly may span the gap between the first vehicle and second vehicle. In a particular and specific embodiment, each wheel assembly can be more than a meter (about four feet) in length. In addition, each guide may have an elongated body and function like a ski to guide a wheel assembly toward a corresponding rail of an adjacent vehicle. Each of the first guide and second guide extend away from the channel. For example, in the example of FIG. 2 when the second vehicle is to the right of the first vehicle, the first guide (e.g., the right guide in FIG. 4) extends away from the channel and towards the second vehicle. In the same example, the second guide (e.g., the left guide in FIG. 4) extends away from the channel and toward the third vehicle (not illustrated) that would be to the left of the first vehicle. In this manner, when moving toward another vehicle, regardless of a vehicle in front (e.g. to the right in FIG. 2) or in back (e.g. to the left in FIG. 2), a corresponding guide (e.g. first guide when the system moves to the right or forward, second guide when system moves to the left or back) contacts the adjacent vehicle (e.g. second vehicle to the right or forward in FIG. 2 and third vehicle to the left or backward in FIG. 2) before any of the plural wheels of a wheel assembly. The respective guide (e.g., first guide or second guide) contacts the corresponding rail of the adjacent vehicle resulting in the channel being guided or placed about the rail so that when the first of the plural wheels contacts the rail, the channel is already in place around the rail.

In one example, the guide may extend upwardly along with outwardly from the channel. In an example, the guide may slope upwardly or have a generally arcuate shape. In another example, the guide may angle upwardly in a straight direction to form a pathway with generally linear sidewalls. By having the guide extend upwardly, when adjacent vehicles are different heights, the upward extension ensures the guide still guides the channel around the corresponding rail, and the plural wheels onto the corresponding rail. Specifically, based on material weight, unloaded vehicles, etc. the height of adjacent vehicles can vary such that the upward extension ensures the wheel assembly appropriately transitions to the next adjacent vehicle without falling off a rail, and without the need for a separate bridge structure between the adjacent vehicles.

In another example, the first wall and second wall each have respective guide surfaces 340A, and 340B. The guide surfaces may be arcuate, an incline plane, and the like. The guide surfaces taper and/or are shaped so that the when the channel moves over a gap and towards a rail of an adjacent vehicle by following a guide, the rail is captured by the guide channel to ensure the proper spacing for the plural wheels contacting the rail. In addition, as the rail moves along the guide surfaces of each of the first wall and second wall, the self-propelled platform is secured in place on the rail.

Figure 6:
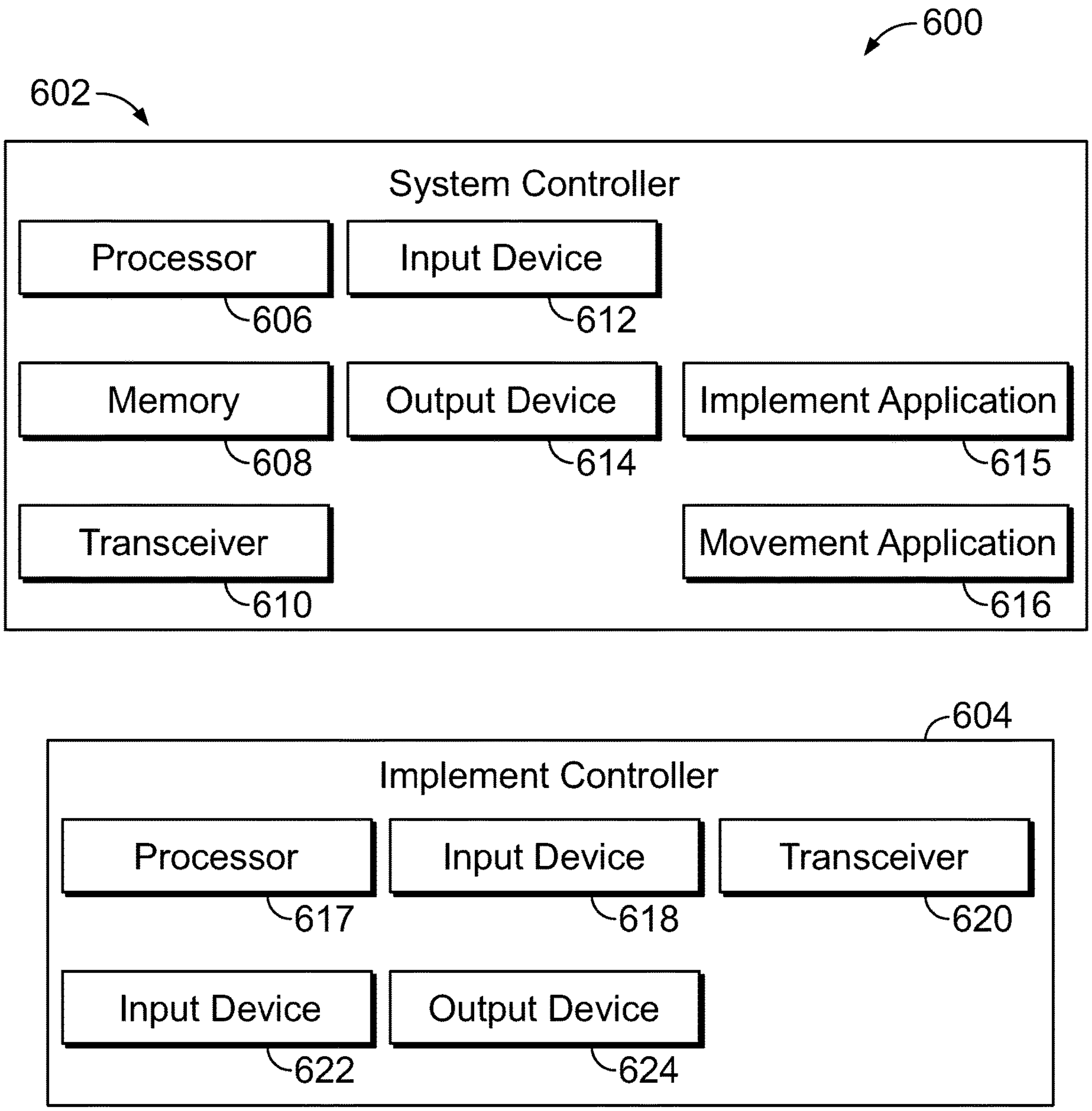
FIG. 6 is a schematic diagram of a control system for a system including a self-propelled platform for a vehicle system.

FIG. 6 illustrates an example control system 600 for a system for providing a movable implement. The control system may include a system controller 602 that communicates with an implement controller 604. The system controller may include one or more processors 606 and a memory 608, which may be an electronic, computer-readable storage device or medium. The memory may be within the housing of the system controller, or alternatively may be on a separate device that may be communicatively coupled to the first communication controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The first communication controller memory can include a tangible, non-transitory computer-readable storage medium that stores data on a temporary or permanent basis for use by the one or more processors. The memory may then be used by the one or more processors to access data for making determinations related to different modes of operation of the first communication controller.

The system controller may include a transceiver 610 that may communicate with the implement controller and remote controller. The transceiver may be a single unit or be a separate receiver and transmitter. In one example, the transceiver may only transmit signals, but alternatively may send (e.g., transmit and/or broadcast) and receive signals.

The system controller may include an input device 612 and an output device 614. The input device may be an interface between an operator, or monitor, and the one or more processors. The input device may include a display or touch screen, input buttons, ports for receiving memory devices, etc. Similarly, the output device may present information and data to an operator or provide prompts for information and data. The output device may similarly be a display or touch screen. In this manner, a display or touch screen may be an input device and an output device.

The system controller may include an implement application 615. The implement application may provide instructions to be implemented by the one or more processors for operating the implement. To this end, in one embodiment, an implement controller may not be provided, and the system controller may be used to control the functioning of the implement. The system controller may include a movement application 616 that may provide instructions to be implemented by the one or more processors for moving the system and moving the self-propelled platform. The movement application may provide instructions for actuating the platform mover to cause movement of the system along a first vehicle, or from a first vehicle to a second vehicle or third vehicle. In one example, the movement application may include a machine learning, or artificial intelligence algorithm to autonomously move the system along the vehicle and from a first vehicle to a second vehicle or third vehicle. To this end, in one example, the movement application and implement application may communicate and utilize a machine learning and/or artificial intelligence algorithm to coordinate movement of the system along with operation of the implement to provide a completely autonomous system.

The implement controller may include one or more processors 617, a memory 618, transceiver 620, input device 622, and output device 624. The implement controller may operate the implement. The implement controller may be operated by an individual operator. In one embodiment, the implement controller may operate autonomously. In one embodiment, the implement controller may have different operating modes. Suitable operating modes may include a traversal mode, an implement engagement mode, a hybrid mode, and a travel mode. The traversal mode may be engaged to move the platform from one vehicle to another, in such a mode the implement on the platform may be locked in place or may be moved to a selected location for the duration of the traversal (e.g., an implement arm may be retracted and tucked in). The implement engagement mode may be used where the implement on the platform performs its function. The hybrid mode may be used where the implement is deployed and functioning while the platform has at least partially transitioned from one vehicle to another. The travel mode may be where the wheel assembly and/or platform is locked in place (e.g., to a set of rails on a vehicle) so that the vehicles may move from one location to another.

Figure 7:
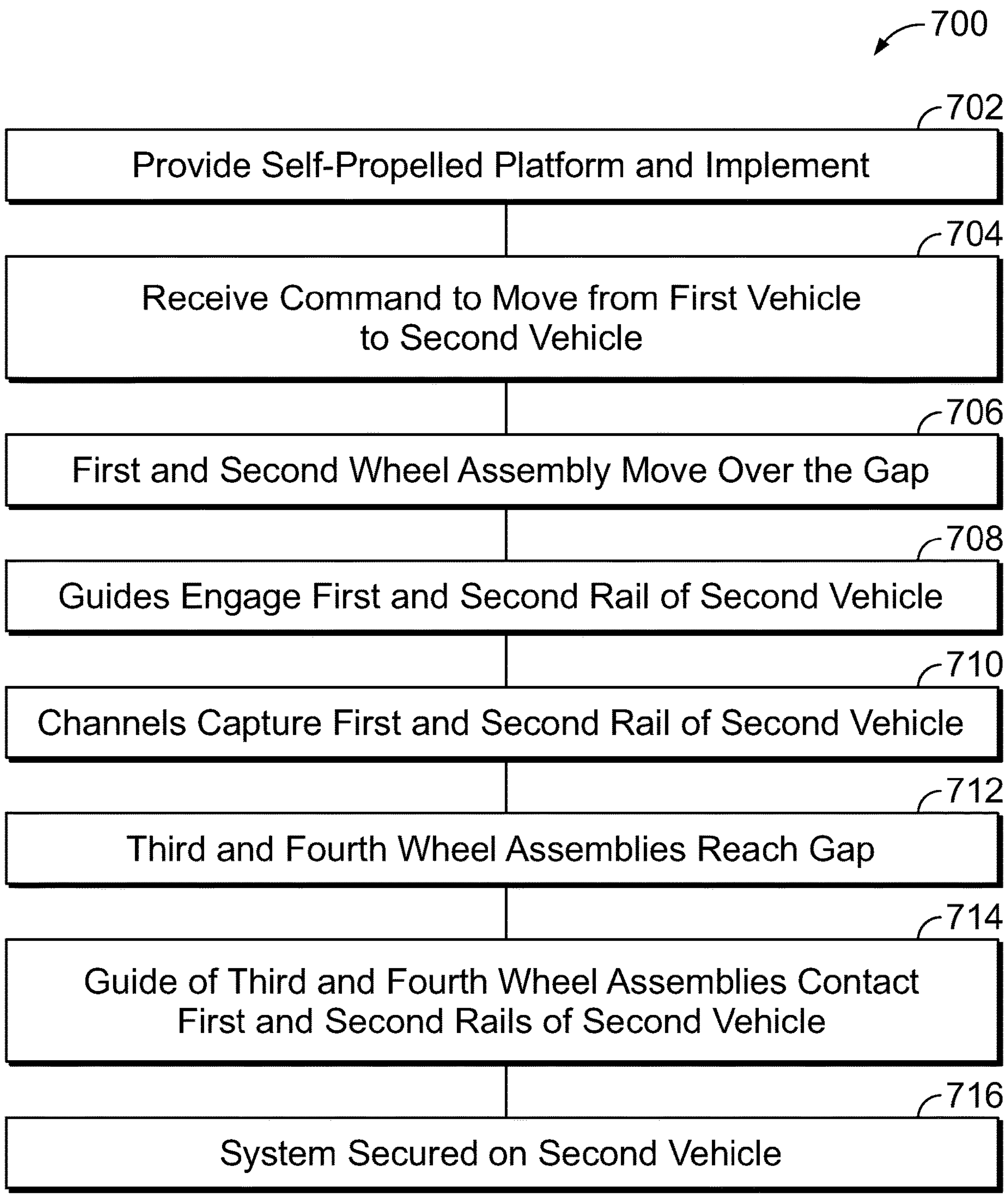
FIG. 7 is a schematic block flow diagram of a process for moving a system including a self-propelled platform between vehicles of a vehicle system.

FIG. 7 illustrates a method 700 for utilizing a movable implement on a multi-vehicle vehicle system. In one example, the vehicle system is the vehicle system of FIG. 1. In another example, the method may be performed at least in part by the system of FIG. 2 or the controllers of FIG. 6.

At step 702, a system that includes a self-propelled platform and an implement is provided on a first vehicle. In one example, the implement may be an excavator that may remove material from the first vehicle.

At step 704, the system may be commanded to move from the first vehicle to an adjacent second vehicle. The command may be provided by a system controller, remote controller, and the like. Based on the command, the system moves from a position where all wheel assemblies of the system contact either a first rail of the first vehicle or a second rail of the first vehicle.

At step 706, a first wheel assembly and a second wheel assembly at a first end of the system begins to move over a gap between the first vehicle and the second vehicle. The first wheel assembly includes a first guide at the first end that extends over the gap before any wheels, tracks, etc. of the wheel assembly begin going over the gap. Similarly, the second wheel assembly includes a first guide that extends over the gap before any wheels, tracks, etc.

At step 708, the first guide of the first wheel assembly engages a first rail of the second vehicle, while the first guide of the second Wheel assembly engages a second rail of the second vehicle. The first guides of each wheel assembly guide the first wheel assembly and second wheel assembly, respectfully, along the first rail and second rail, respectfully, of the second vehicle. In this manner, the first wheel assembly and second wheel assembly remain aligned with the first rail and second rail of the second vehicle while the first wheel assembly and second wheel assembly go over the gap between the first vehicle and second vehicle. At this time, a portion of the system remains on the first vehicle secured on the first rail and second rail of the first vehicle.

At step 710, the channel of the first wheel assembly captures the first rail of the second vehicle, while the channel of the second wheel assembly captures the second rail of the second vehicle system. In one example, each channel includes a first wall and second wall with guide surfaces for sliding against each rail as the first wheel assembly and second wheel assembly begin to move along the first rail and second rail of the second vehicle. In this manner, the first wheel assembly and second wheel assembly are secured to the first rail and second rail respectfully.

At step 712, a third wheel assembly and fourth Wheel assembly located at a second end of the system reach the gap between the first vehicle and second vehicle. Each of the third Wheel assembly and fourth wheel assembly include first guides that extend over the gap between the first vehicle and second vehicle before the plural wheels, tracts, etc. of the respective third wheel assembly and fourth wheel assembly reach the gap.

At step 714, the first guide members of the third wheel assembly and fourth wheel assembly contact the respective first rail and second rail of the second vehicle. At this time, a portion of the system is already over the second vehicle because the first wheel assembly and second wheel assembly have already been secured to the first rail and second rail respectfully of the second vehicle. The first guide members guide the system such that the channel of each of the respective third wheel assembly and fourth Wheel assembly contact the first rail and second rail respectfully.

At step 716, as the system continues moving onto the second vehicle, the guide surfaces of the respective third wheel assembly and fourth wheel assembly secure the third wheel assembly and four wheel assembly to the first rail and second rail respectfully of the second vehicle. Once secured, the system may then move along the second vehicle accordingly.

The controller for the platform may include, a sensor or locator so that the controller is aware of the proximity of the platform relative to an end of a vehicle, and/or the end of the rails on which the platform rests. The controller may perform one or more operations using that information. For example, the controller may notify an operator as the platform approaches to a determined distance to a rail end; may automatically stop the platform at the rail end or within a determined distance of the rail end; may automatically engage a traversal operating mode of the platform upon the platform reaching the rail end; may send an operating command to the implement so that the implement performs a determined task during (or in anticipation of) the traversal; and the like. In one embodiment, the controller signals the motive equipment for the first and/or second vehicles. For example, it may notify them that a traversal is or will occur and they should not attempt to move until complete traversal. In other embodiments, the controller receives information from the vehicle motive equipment that there is current movement, there is anticipated movement (to make a determination on whether to initiate a traversal), or that there is environmental information to consider. Regarding environmental information, that may include whether there is an upcoming turn in the route of the vehicles, upcoming infrastructure (bridge, tunnel, and the like), a grade, wayside equipment, a crossing (e.g., with a road), vegetation, an oncoming vehicle in an adjacent track, and the like, Additional information aspects may include to which side of the vehicles the information relates is the oncoming vehicle on the left or right side, will the vehicles be turning to their right or left, what is the height of the upcoming bridge, and so on. With such information, the controller may modify operation of the platform and/or the implement.

In some example embodiments, a system is provided that may include a self-propelled platform that may traverse a first rail and a second rail of a first vehicle, the first rail and the second rail separated in spaced relation. The self-propelled platform may include a wheel assembly that may engage the first rail and the second rail. The wheel assembly may include at least one guide extending away from the self-propelled platform and having a size and shape to engage a first rail of a first vehicle or a first rail of a second vehicle while a portion of the self-propelled platform remains on the first rail of the first vehicle, to guide the wheel assembly onto the first rail of the second vehicle.

The self-propelled platform may include an implement coupling for receiving an implement. In one aspect, the implement may be an excavator that may excavate materials from the first vehicle or the second vehicle. In another aspect, the first vehicle and the second vehicle may be coupled and may be part of a rail vehicle system. In one example, the wheel assembly may include a first wheel assembly having plural wheels aligned with one another and within a channel of size and shape to have the first rail of the first vehicle or the first rail of the second vehicle disposed between a first wall and second wall of the channel. In another example, the guide may extend from the channel of the first wheel assembly. In yet another example, the first wall of the channel may include a first guide surface that may guide the wheel assembly onto the first rail of the first vehicle or the first rail of the second vehicle. In another example, the second wall of the channel may include a second guide surface that may guide the wheel assembly onto the first rail of the first vehicle or the first rail of the second vehicle.

Optionally, the wheel assembly may include a first wheel assembly that may engage the first rail of the first vehicle and a second wheel assembly aligned with the first wheel assembly and that may engage the first rail of the first vehicle. In one aspect, the wheel assembly may include a third wheel assembly that may engage a second rail of the first vehicle and a fourth wheel assembly aligned with the third wheel assembly and that may engage the second rail of the first vehicle. In another aspect, the at least one guide may be a first guide that may extend from the first wheel assembly and may engage the first rail of the second vehicle. The system may include a second guide that may extend from the second wheel assembly and having a size and shape to engage a first rail of a first vehicle while a portion of the self-propelled platform is on the first rail of the section vehicle, to guide the wheel assembly onto the first rail of the second vehicle. In one example, the system may include a third guide that may extend from the third wheel assembly and may have a size and shape to engage the second rail of the second vehicle to guide the wheel assembly onto the second rail of the second vehicle. The system may additionally have a fourth guide that may extend from the fourth wheel assembly and may have a size and shape to engage the second rail of the first vehicle to guide the wheel assembly onto the second rail of the second vehicle. In another example, the at least one guide may extend upwardly from the wheel assembly.

In one or more examples, a system is provided that may include a self-propelled platform that may traverse a first rail of a first vehicle and a first rail of a second vehicle, the first rail of the first vehicle and the first rail of the second vehicle separated in spaced relation. The self-propelled platform may include a wheel assembly that may engage the first rail of the first vehicle and the first rail of the second vehicle. The wheel assembly may include a first wheel assembly that may have first plural wheels and a first guide extending away from the self-propelled platform. The first guide may have a size and shape to engage a first rail of a second vehicle to guide the self-propelled platform onto the first rail of the second vehicle. The system may include a second wheel assembly having second plural wheels and a second guide extending away from the self-propelled platform. The second guide may have a size and shape to engage a second rail of the second vehicle to guide the self-propelled platform onto the second rail of the second vehicle.

Optionally, the first wheel assembly may include a first wall with a first tapered section, and a second wall having a second tapered section. The first wall may be spaced from the second wall to form a first channel of size and shape to have the first rail of the first vehicle and the first rail of the second vehicle to be disposed within the first channel. In one aspect, the self-propelled platform may include an implement coupling for receiving an implement. In another aspect, the implement may be an excavator that may excavate materials from the first vehicle or the second vehicle.

In one or more examples, a system is provided that may include a self-propelled platform that can be coupled to an excavator and that may traverse a first rail and a second rail of a first vehicle. The first rail and the second rail may be separated in spaced relation. The self-propelled platform may include a wheel assembly that may engage the first rail and the second rail. The wheel assembly may include a first wheel assembly having first plural wheels and a first guide extending away from the self-propelled platform. The first guide may have a size and shape to engage a first rail of a second vehicle to guide the self-propelled platform onto the first rail of the second vehicle. The wheel assembly may additionally include a second wheel assembly having second plural wheels and a second guide extending away from the self-propelled platform. The second guide may have a size and shape to engage a second rail of the second vehicle to guide the self-propelled platform onto the second rail of the second vehicle.

Optionally, the wheel assembly may include a third wheel assembly having third plural wheels and a third guide extending away from the self-propelled platform. The third guide may have a size and shape to engage a first rail of the first vehicle to guide the self-propelled platform onto the first rail of the second vehicle. The wheel assembly may additionally include a fourth wheel assembly having fourth plural wheels and a fourth guide extending away from the self-propelled platform. The fourth guide may have a size and shape to engage a second rail of the first vehicle to guide the self-propelled platform onto the second rail of the second vehicle. In one aspect, the excavator may be rotatably coupled on the self-propelled platform.

In some example embodiments, the device performs one or more processes described herein. In some example embodiments, the device performs these processes based on processor executing software instructions stored by a computer-readable medium, such as a memory and/or a storage component. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms “processor” and “computer,” and related terms, e.g., “processing device,” “computing device,” and “controller” may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term “non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the system may have a local data collection system deployed that may use machine learning to enable derivation-based learning outcomes. The communication system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The maintenance system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a self-propelled platform configured to traverse from a first rail of a first vehicle to a first rail of a second vehicle, the first rail of the first vehicle and the first rail of the second vehicle being separated in spaced relation;

the self-propelled platform including a wheel assembly having plural wheels that are configured to engage the first rail of the first vehicle and the first rail of the second vehicle; and the wheel assembly including at least one guide being configured to engage the first rail of the second vehicle while a wheel of the plural wheels remains on the first rail of the first vehicle, the at least one guide configured to guide the wheel assembly from the first rail of the first vehicle onto the first rail of the second vehicle, wherein the at least one guide extends outward in a forward direction of movement of the self-propelled platform, away from the plural wheels.

2. The system of claim 1, wherein the plural wheels of the wheel assembly are aligned with one another and are within a channel of size and shape to have the first rail of the first vehicle or the first rail of the second vehicle disposed between a first wall and second wall of the channel.

3. The system of claim 2, wherein the at least one guide extends from the channel of the wheel assembly.

4. The system of claim 2, wherein the first wall of the channel includes a first guide surface configured to guide the wheel assembly onto the first rail of the first vehicle or the first rail of the second vehicle.

5. The system of claim 4, wherein the second wall of the channel includes a second guide surface configured to guide the wheel assembly onto the first rail of the first vehicle or the first rail of the second vehicle.

6. The system of claim 1, wherein the wheel assembly includes a first wheel assembly configured to engage the first rail of the first vehicle and a second wheel assembly aligned with the first wheel assembly and configured to engage the first rail of the first vehicle.

7. The system of claim 6, wherein the wheel assembly includes a third wheel assembly configured to engage a second rail of the first vehicle and a fourth wheel assembly aligned with the third wheel assembly and configured to engage the second rail of the first vehicle.

8. The system of claim 7, wherein the at least one guide is a first guide that extends from the first wheel assembly and engages the first rail of the second vehicle, the system further comprising a second guide that extends from the second wheel assembly and having a size and shape to engage the first rail of the second vehicle while a portion of the self-propelled platform is on the first rail of the first vehicle, to guide the second wheel assembly onto the first rail of the second vehicle.

9. The system of claim 8, further comprising a third guide that extends from the third wheel assembly and having a size and shape to engage the second rail of the second vehicle to guide the third wheel assembly onto the second rail of the second vehicle; and a fourth guide that extends from the fourth wheel assembly and having a size and shape to engage the second rail of the second vehicle to guide the wheel assembly onto the second rail of the second vehicle.

10. The system of claim 1, wherein the at least one guide extends upwardly from the wheel assembly.

11. The system of claim 1, wherein the self-propelled platform includes an implement coupling for receiving an implement.

12. The system of claim 11, wherein the implement is an excavator configured to excavate materials from the first vehicle or the second vehicle.

13. The system of claim 1, wherein the first vehicle and the second vehicle are coupled and are part of a rail vehicle system.

14. A system comprising:

a self-propelled platform configured to traverse a first rail of a first vehicle and a first rail of a second vehicle, the first rail of the first vehicle and the first rail of the second vehicle separated in spaced relation, the self-propelled platform including a wheel assembly configured to selectively engage the first rail of the first vehicle and the first rail of the second vehicle; and the wheel assembly comprising:

a first wheel assembly having first plural wheels and a first guide extending outward in a forward direction of movement of the self-propelled platform away from the plural wheels, the first guide having a size and shape to engage the first rail of the second vehicle to guide the self-propelled platform onto the first rail of the second vehicle; and a second wheel assembly having second plural wheels and a second guide extending outward in the forward direction of movement of the self-propelled platform away from the plural wheels, the second guide having a size and shape to engage a second rail of the second vehicle to guide the self-propelled platform onto the second rail of the second vehicle.

15. The system of claim 14, wherein the first wheel assembly includes a first wall with a first guide surface, and a second wall having a second guide surface, the first wall spaced from the second wall to form a first channel of size and shape to have the first rail of the first vehicle and the first rail of the second vehicle to be disposed within the first channel.

16. The system of claim 14, wherein the self-propelled platform includes an implement coupling for receiving an implement.

17. The system of claim 16, wherein the implement is an excavator configured to excavate materials from the first vehicle or the second vehicle.

18. A system comprising:

a self-propelled platform coupled to an excavator and configured to traverse a first rail of a first vehicle and a first rail of a second vehicle, the first rail of the first vehicle and the first rail of the second vehicle separated in spaced relation;

the self-propelled platform including a wheel assembly configured to engage the first rail of the first vehicle and the first rail of the second vehicle; and the wheel assembly comprising:

a first wheel assembly having first plural wheels and a first guide extending outward in a forward direction of movement of the self-propelled platform away from the plural wheels, the first guide having a size and shape to engage the first rail of the second vehicle to guide the self-propelled platform onto the first rail of the second vehicle; and a second wheel assembly having second plural wheels and a second guide extending outward in the forward direction of movement of the self-propelled platform away from the plural wheels, the second guide having a size and shape to engage the first rail of the second vehicle to guide the self-propelled platform onto the first rail of the second vehicle.

19. The system of claim 18, wherein the wheel assembly further comprising:

a third wheel assembly having third plural wheels and a third guide extending away from the self-propelled platform, the third guide having a size and shape to engage a second rail of the second vehicle to guide the self-propelled platform onto the second rail of the second vehicle; and a fourth wheel assembly having fourth plural wheels and a fourth guide extending away from the self-propelled platform, the fourth guide having a size and shape to engage the second rail of the second vehicle to guide the self-propelled platform onto the second rail of the second vehicle.

20. The system of claim 18, wherein the excavator is rotatably coupled on the self-propelled platform.

21. A method comprising:

traversing a self-propelled platform from a first rail on a first vehicle to a first rail on a second vehicle, the self-propelled platform including a wheel assembly having plural wheels and at least one guide extending outward in a forward direction of movement of the self-propelled platform away from the plural wheels, the at least one guide having a size and shape to engage the first rail of the second vehicle while a portion of the self-propelled platform remains on the first rail of the first vehicle to guide the wheel assembly onto the first rail of the second vehicle; and controlling an implement on the platform based at least in part on an operating mode of the platform that is determined by a location of the platform relative to an end of the first rail.

* * * * *